Patented Dec. 22, 1931

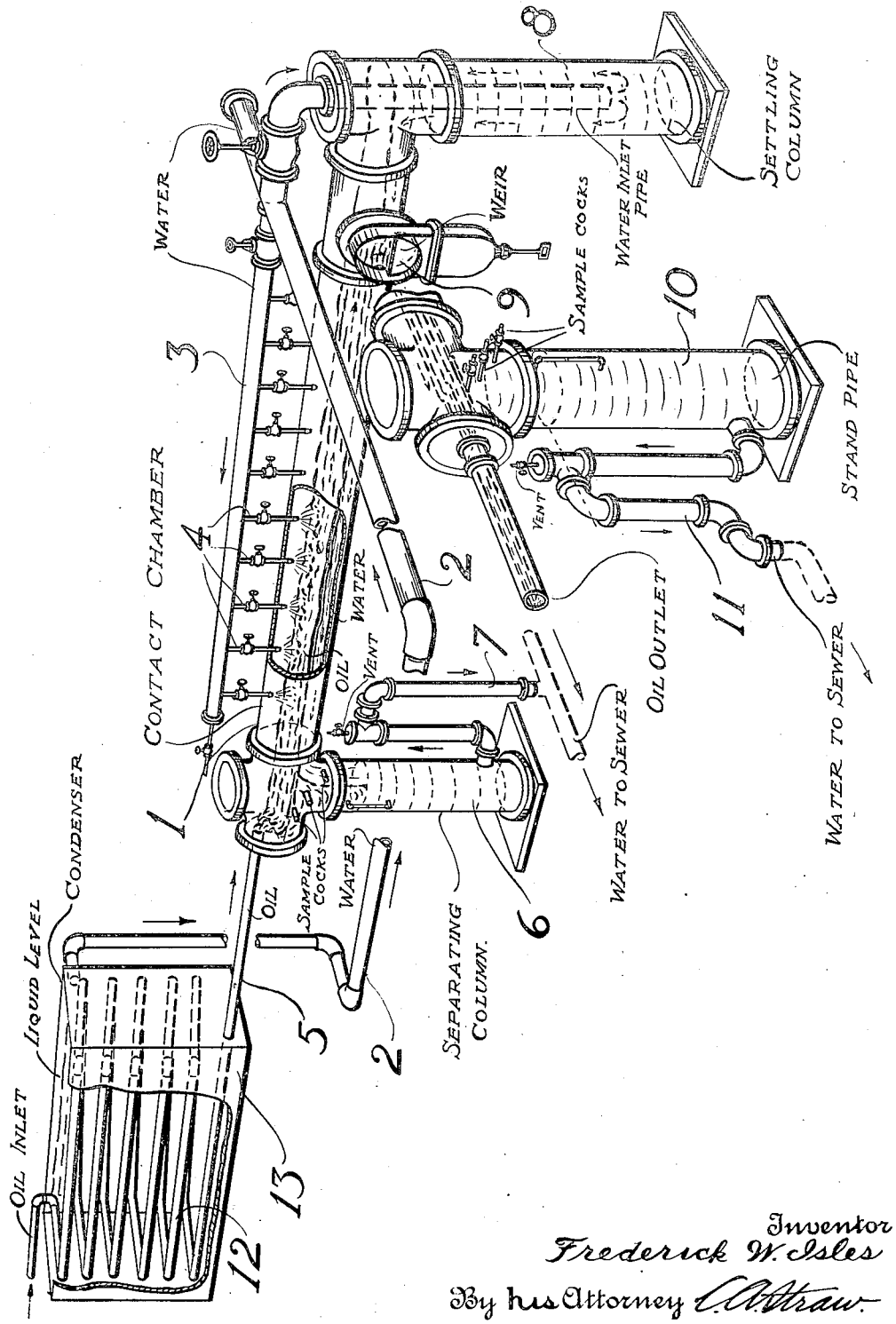

1,838,029

UNITED STATES PATENT OFFICE

FREDERICK W. ISLES, OF BAYONNE, NEW JERSEY, ASSIGNOR TO STANDARD OIL DEVELOPMENT COMPANY, A CORPORATION OF DELAWARE

METHOD FOR PURIFYING LIQUIDS AND APPARATUS FOR ACCOMPLISHING THE SAME

Application filed June 21, 1928. Serial No. 287,314.

This invention relates to improvements in methods and apparatus for contacting immiscible liquids, especially petroleum oil and water or aqueous solutions. The invention will be described by way of example as applied to the washing of petroleum oil distillates with water, but it will be understood that my improvements may be used in other connections.

The invention will be fully understood from the following description read in connection with the accompanying drawing in which the figure is a perspective view of a preferred equipment.

In the drawing, 1 denotes a long contact chamber which may advantageously be made of sections of pipe bolted together. The immiscible liquids to be contacted, for example water and oil, are introduced into the chamber 1 at opposite ends. In the equipment shown, water is supplied from a main 2 and header 3 provided with a large number of spray pipes 4. Oil enters the chamber from a main 5. The water flows along the bottom of the chamber and is discharged into a separating column 6, from which it overflows through pipe 7 to the sewer.

The oil flows in chamber 1 upon the surface of the water stream and counter-current to it for discharge into a settling column 8. An adjustable weir 9 is provided at the outlet of the settling column 8 for controlling the overflow of oil. Any water that may overflow with the oil accumulates in stand-pipe 10, and overflows through line 11 to the sewer. Not much loss of water takes place here as the water inlet pipe is extended far down into the settling chamber 8 and the outflow and inflow of liquids are accomplished without substantial agitation.

The water introduced through the inlet pipe into the settling column 8 has its velocity of flow reduced in column 8 and flows from column 8 into chamber 1 without turbulence.

The oil is preferably flowed through the chamber 1 as a shallow layer upon a water layer of substantial depth. In its counter-current flow with the water layer, the oil is thoroughly washed. Some agitation is desirable at the interface between the oil and water and is conveniently provided by the spray pipes 4 which shower water upon the surface of the oil. The sprayed water acts as a solvent for impurities as it passes through the oil and also sets up a turbulent flow. In the equipment described, the liquids are contacted with very little frictional resistance to flow, as compared with prior devices involving the use of bell cap towers, treating tanks through which the oil flows upwardly, and the like.

I have found that the advantages of the invention are especially marked in the water scrubbing of petroleum oil distillates containing hydrogen sulfid. When used for this purpose, I prefer to flow the distillate direct from the condenser 12 into the contact chamber 1 through main 5. The washing equipment may alternatively be installed with advantage between the receiving house and the "run down" or storage tank. The water removes a large part or all of the hydrogen sulfid and correspondingly reduces the corrosiveness of the oil. This means lessened corrosion damage to tanks and lines and diminished risk of tank explosions through the formation and subsequent oxidation of iron sulfid scale. The toxicity of the vent vapors is also reduced.

Cold salt water is preferably used as the washing medium. It may be obtained from the overflow of condenser box 13 or from any other suitable source. After the water washing, the distillate may be passed to equipment of the type described for treating with caustic soda solution, if any hydrogen sulfid remains, or may be otherwise suitably treated. However, the caustic soda or other treating may be carried out in equipment of any desired type, following the washing with water in the manner described. It will be understood also, that in any cases where water washing may not be required, the equipment may be used for treating with aqueous or other treating solutions.

Only one installation of the improved apparatus has been shown, but it will be understood that in ordinary refinery practice, a separate installation will be provided for each "run down" line delivering distillate that requires washing. All the distillate products of the still may accordingly be washed as an incident to their continuous flow from the condensers.

I have used the term "immiscible liquids" to mean liquids which are not mutually miscible or soluble to an extent sufficient to prevent application of my method. Various changes and alternative arrangements may be made within the scope of the appended claims in which it is my intention to claim all novelty inherent in the invention as broadly as the prior art permits.

I claim:

1. Method of contacting immiscible liquids, which comprises maintaining a counter-current flow of one of the liquids upon the other through an extended horizontal path.

2. Method of contacting immiscible liquids, which comprises maintaining a counter-current flow of one of the liquids upon the other through an extended horizontal path and setting up a turbulent flow between the liquids.

3. Method of contacting immiscible liquids, which comprises flowing layers of the liquids counter-currently through an extended horizontal path in contact through a treating zone, setting up turbulent flow between the layers, withdrawing the liquids from said zone, settling the withdrawn liquids and removing the settled liquids separately.

4. Apparatus for contacting liquids of different gravities, which comprises a chamber, means for flowing the relatively heavy liquid through the chamber with its surface moving in a substantially horizontal direction, and means for flowing the relatively light liquid through the chamber on the surface of and counter-current to the heavier liquid.

5. Apparatus for contacting liquids of different gravities, which comprises a chamber, means for flowing the relatively heavy liquid through the chamber with its surface moving in a substantially horizontal direction, means for flowing the relatively light liquid through the chamber on the surface of and counter-current to the heavier liquid, and means for establishing turbulence at the interface between the liquids.

6. Apparatus for contacting liquids of different gravities, which comprises a chamber, means for flowing the relatively heavy liquid through the chamber with its surface moving in a substantially horizontal direction, means for flowing the relatively light liquid through the chamber on the surface of and counter-current to the heavier liquid, and means adapted to inject fluid against the upper surface of the lighter liquid in the chamber.

7. Method of washing petroleum oil distillate containing hydrogen sulfide, which comprises flowing the distillate directly from a zone in which it has been condensed through an elongated treating zone, flowing a stream of water through the zone counter-currently to the distillate, establishing turbulence at the interface between the countercurrently flowing streams of distillate and water by spraying water upon the surface of the distillate stream, and separately withdrawing distillate and water.

8. Apparatus for contacting immiscible liquids, which comprises an elongated treating chamber, means near each end of the chamber for respectively supplying the liquids to be contacted, spray pipes arranged along the treating chamber for injecting liquid upon the stream therethrough, means for discharging the liquids from the chamber, and means for separating the liquids discharged from the chamber.

9. Apparatus according to claim 8, in which means are provided for adjusting the depth of liquid flowing through the treating chamber.

FREDERICK W. ISLES.